United States Patent [19]

Bedford

[11] Patent Number: 4,817,568
[45] Date of Patent: Apr. 4, 1989

[54] DUAL FUEL COMPRESSION IGNITION ENGINE

[75] Inventor: Timothy J. Bedford, Castle Donnington, United Kingdom

[73] Assignee: Gaspower International Limited, Derby, United Kingdom

[21] Appl. No.: 52,852

[22] PCT Filed: Aug. 21, 1986

[86] PCT No.: PCT/GB86/00499

§ 371 Date: Apr. 15, 1987

§ 102(e) Date: Apr. 15, 1987

[87] PCT Pub. No.: WO87/01163

PCT Pub. Date: Feb. 26, 1987

[30] Foreign Application Priority Data

Aug. 24, 1985 [GB] United Kingdom ............... 8521244

[51] Int. Cl.⁴ ............................................. F02D 19/10
[52] U.S. Cl. ............................... 123/431; 123/27 GE; 123/525
[58] Field of Search .................. 123/27 GE, 390, 431, 123/478, 525, 526, 575, 357

[56] References Cited

U.S. PATENT DOCUMENTS

| | | |
|---|---|---|
| 2,544,978 | 3/1951 | Blessing et al. |
| 2,558,884 | 7/1951 | Steven et al. ................ 123/27 GE |
| 2,569,002 | 9/1951 | Holloway et al. |
| 2,612,145 | 9/1952 | Steven et al. ................ 123/27 GE |
| 2,612,880 | 10/1952 | Schowalter ................... 123/27 GE |
| 3,575,145 | 4/1971 | Steiger ............................ 123/478 X |
| 3,707,950 | 1/1973 | Schlimme ...................... 123/357 |
| 4,109,669 | 8/1978 | Rivere ............................ 123/458 X |
| 4,223,654 | 9/1980 | Wessel et al. ................. 123/358 |
| 4,248,194 | 2/1981 | Drutchas et al. ............. 123/390 X |
| 4,359,032 | 11/1982 | Ohie ............................... 123/458 |
| 4,449,506 | 5/1984 | Drutchas ....................... 123/390 X |
| 4,476,827 | 10/1984 | Basaglia et al. ............... 123/276 |
| 4,517,928 | 5/1985 | Wolters ......................... 123/27 GE |
| 4,603,674 | 8/1986 | Tanaka .......................... 123/357 X |
| 4,606,322 | 8/1986 | Reid et al. ..................... 123/494 X |
| 4,619,240 | 10/1986 | Bedford et al. ............ 123/27 GE X |
| 4,641,625 | 2/1987 | Smith ......................... 123/27 GE X |

FOREIGN PATENT DOCUMENTS

| | | |
|---|---|---|
| 887583 | 8/1953 | Fed. Rep. of Germany. |
| 1232785 | 1/1967 | Fed. Rep. of Germany. |
| 2143676 | 3/1973 | Fed. Rep. of Germany. |
| 2080128 | 11/1971 | France. |
| 2509855 | 1/1983 | France. |
| 2544798 | 10/1984 | France. |
| 395644 | 12/1965 | Switzerland. |
| 1007313 | 10/1965 | United Kingdom. |

OTHER PUBLICATIONS

"Biogas as an Alternative Fuel for Agricultural Tractors", *Technische Rundschau*, No. 33, Aug. 14, 1984, p. 9.

*Primary Examiner*—Tony M. Argenbright
*Attorney, Agent, or Firm*—Marshall, O'Toole, Gerstein, Murray & Bicknell

[57] ABSTRACT

A dual fuel compression ignition engine (10) comprises a gas fuel supply system (20-25) for the engine (10), and a diesel fuel supply system (12-16) for the engine, including an injection pump (11) having a governor and a control member to control the amount of diesel fuel injected into the engine by the pump (11), and means (13') to arrest movement of the control member (11a) in the direction to increase the supply of diesel fuel to the engine, at a position to supply pilot fuel at a constant, or substantially constant, rate, the position for arrest being determined in accordance with at least one operating condition of the engine, such as the engine speed. Another embodiment shows a present rail system. In both, the amount of pilot diesel fuel is adjusted by a feed-back signal indicative of the amount of pilot fuel injected.

15 Claims, 3 Drawing Sheets

DUAL FUEL COMPRESSION IGNITION ENGINE

DESCRIPTION OF INVENTION

This invention relates to a dual fuel compression ignition engine. In this specification the term "compression ignition engine" is intended to refer, not only to an engine operating on a constant pressure, i.e. diesel cycle, but also an engine operating on a compression ignition cycle. In such an engine, during dual fuel operation, a gaseous fuel is mixed with air and the mixture is inducted into the engine. The temperature and pressure prevailing at the end of the compression stroke, whilst they would be sufficient to ignite diesel oil, are insufficient to ignite the gas/air mixture. Accordingly, to achieve ignition, a small amount of diesel oil is injected into the engine using a conventional injection pump and injector system. This small amount of diesel oil, hereinafter referred to as pilot fuel, ignites and consequently ignites the gas/air mixture so that combustion thereof takes place.

It is desirable to inject the minimum amount of pilot fuel in order to minimise the proportion of diesel fuel used since diesel fuel is more expensive than gas.

Practical experience shows that a suitable ratio at full throttle operation for a typical automotive diesel which it is desired to convert to operate on gas is around 10% diesel oil and 90% gas in terms of the energy provided by the respective fuels.

The injection of the required amount of pilot fuel is achieved by positioning a control member, conventionally referred to as the rack, in an injection pump of the type which pumps discrete volumes or "slugs" of fuel to the injector system, to the position appropriate for the amount of fuel. It has been found that if the control member is maintained in a fixed position to give the desired amount of pilot fuel at full throttle operation, the amount of pilot fuel injected per stroke of the engine increases significantly, and sometimes very substantially, with engine speed.

An object of the invention is, therefore, to provide a dual fuel compression ignition engine wherein the above mentioned problem is overcome or is reduced and, more generally, more accurately to control the amount of pilot diesel fuel injected.

According to one aspect of the present invention we provide a dual fuel compression ignition engine comprising a gas fuel supply system for the engine, a diesel fuel supply system for the engine, including an injection pump having a governor and a control means to control the amount of diesel fuel injected into the engine by the pump, and means to arrest movement of a control member, in the direction to increase the supply of diesel fuel to the engine, at a position to supply pilot fuel at a constant, or substantially constant rate, said position being determined in accordance with at least one operating condition of the engine.

The position of the injection pump control member can thus be determined, for example from rig testing, to be in its optimum position to give good ignition with the minimum amount of pilot fuel.

Said at least one operating condition of the engine may comprise the engine speed.

The position at which movement of the control member of the pump is arrested can be determined, not only on the basis of engine speed, but also by other operating conditions such as the position of the speed control (i.e. throttle) of the engine, alone or in combination with the engine speed.

If desired a feed-back signal may be used in determining the position at which movement of the control member is arrested.

The feed-back signal may be indicative of the amount of pilot fuel injected into the engine.

The feed-back signal may be dependent upon the temperature of the pilot fuel, or the actual power developed by the engine.

If desired other means may be provided to generate a feed-back signal, which signal may be used to check that the amount of pilot diesel fuel actually being injected into the engine corresponds with that required for the position of the control member in accordance with the operating condition.

According to another aspect of the present invention we provide a dual fuel compression ignition engine having a gas fuel supply system for the engine, a diesel fuel supply system for the engine, including an injection pump and a control means to control the amount of pilot diesel fuel injected into the engine and first means to provide a first input to the control means to cause the control means to supply pilot fuel at a predetermined rate in accordance with at least one operating parameter of the engine and second means to provide a second input to said control means to modify the supply of pilot fuel signalled by the first means in accordance with at least one further parameter of the engine.

Said at least one operating parameter of the engine may comprise the speed of the engine.

Said at least one further parameter of the engine may comprise a feed-back signal.

The feed-back signal may be indicative of the amount of pilot diesel fuel actually being injected into the engine and the control means may be adapted to adjust the supply of the pilot fuel to correspond to that signalled by the first input.

The injector pump may be of the type which pumps discrete volumes of fuel to the injector system.

In one embodiment, the feedback signal is derived from a strain gauge which determines the pressure of the diesel fuel in a feed line from the injection pump, means being provided to correlate the pressure with the amount of fuel injected into the engine from the injection pump.

For example the strain gauge may be provided on a membrane on which the diesel fuel acts.

In another embodiment instead of a strain gauge the or one or more of the injectors through which fuel is injected into the engine, may be provided with an accelerometer to sense the opening and/or closing of the injector and provide a signal from which the amount of fuel injected into the engine may be determined to provide said feed-back signal.

In another embodiment the or one or more of the injectors through which pilot diesel fuel is injected into the engine may be provided with means to detect when and/or the extent to which a valve of the or each injector is open and provide a signal from which the amount of fuel injected into the engine may be determined to provide said feed-back signal.

In another embodiment differential pilot diesel fuel flow means may be provided to determine the difference between the amount of pilot diesel fuel supplied to the injector system and the amount of pilot diesel fuel returned from the injector system and provide a signal from which the amount of fuel injected into the engine is derived to provide said feed-back signal.

The control member may be positionable by power operated means such as a stepping electric motor, a DC electric motor, a hydraulic or pneumatic ram or a diesel controlled actuator.

The means which arrest movement of the control member may comprise a member which mechanically engages the control member or means to disengage the power means.

Because no restraint is placed on the control member for moving towards its minimum flow position, in the event of the governor which controls the position of the control member requiring movement of the control member in the direction to reduce the supply of diesel fuel, this can take place. For example, in the event of failure of the gas supply mechanism in a full flow position, the engine will not overspeed because the governor will operate to reduce the amount of diesel supplied and so move the control member to a position at which no diesel oil is supplied and, therefore, there will be no diesel supplied to initiate ignition of the gas so the engine will slow down to its governed speed.

Alternatively, the injection pump may be of the type which provides a continuous flow of pilot diesel fuel which is fed by a continuously pressurised supply line to the injector system and the injector system being arranged to inject discrete volumes of pilot diesel fuel into the or each cylinder of the engine from said supply line.

In this case the feed-back signal is derived from a differential pilot diesel fuel flow means which determines the difference between the amount of pilot diesel fuel supplied to the injector system and the amount of pilot diesel fuel returned from the injector system to provide a signal from which the amount of fuel injected into the engine may be determined to provide said feed-back signal.

The engine may be provided with a fuel control system comprising flow control means adapted to control the relative proportions of each fuel supplied to the engine, wherein the system includes means to provide an error signal derived from engine speed and throttle position and means responsive to the error signal to supply the diesel and gas fuels to cause the engine speed to tend towards a speed demanded by the throttle position.

The system may include an engine speed sensor to provide an engine speed signal responsive to engine speed, a throttle position sensor, to provide a throttle position signal responsive to the throttle position, the control means being responsive to the engine speed and throttle position signals to provide a first fuel control signal and a second fuel control signal to the diesel fuel and gas fuel supply systems respectively to cause the engine speed to tend towards said speed determined by the throttle position.

Said control means may comprise an electronic signal processing means having a programmed control algorithm in which the difference between said throttle position and engine speed is calculated and used as an error signal.

The second fuel signal provided by the electronic signal processing means may be electronically compared with a pressure signal dependent upon the pressure of the gas fuel supply and a gas supply valve is controlled in dependence on a predetermined relationship between said pressure signal and the gas fuel supply control signal.

The electronic signal processing means may include a look-up table containing information concerning gas flow as a function of a valve opening and gas fuel pressure whereby the look-up table gives the required valve opening for the required gas flow and the detected gas pressure.

Additional stored information may be used with the error signal to determine the relative proportions of the diesel and gas fuels, which may ensure that the diesel fuel is supplied at a constant or substantially constant rate, and the second fuel at a variable rate. This may be at least when the engine speed is above a threshold where the position of the control member is arrested.

A sensing means may be provided to sense the operating condition of the engine, which sensing means may provide a signal to the control means which determines the position at which the control means is arrested in accordance with said stored information.

Where a feed-back signal generating means is provided, the feed-back signal may also be fed to the control means or an auxiliary control means, which causes the position at which the control member is arrested to be adjusted in accordance with the required and actual amounts of diesel fuel delivered to the engine.

Thus, after initial calibration, it is not necessary to recalibrate the engine. It will be appreciated that as the engine is used, the amount of diesel fuel fed to the engine with the control member in its arrested position may vary, as seals become worn for example, or as the injectors carbonise. By providing a feed-back signal as described it can be ensured that the amount of fuel delivered for the given condition of the engine is correct. Further, any inaccuracy in the power operated means, where provided, can be accommodated.

The invention is based on our discovery that the increase in the amount of fuel injected with increase in engine speed is due to leakage of pilot fuel between the piston and a sleeve of the injection pump. The faster the engine speed the less time there is for this leakage to occur and thus more pilot fuel is injected into the engine at higher speeds. If, therefore, the rack is fixed in a position to give the amount of pilot fuel necessary for satisfactory ignition at, for example, low speeds, it will inject more pilot fuel at high speeds than is required for ignition and thus the proportion of pilot fuel to gas in the fuel at high speeds is greater than is necessary.

It has also been found that there is some merit in injecting a larger amount of pilot fuel per piston stroke at low engine speed than is required at high engine speed in order to give satisfactory throttle response and engine acceleration.

An example of the invention will now be described with reference to the accompanying drawings wherein.

Figure 1:
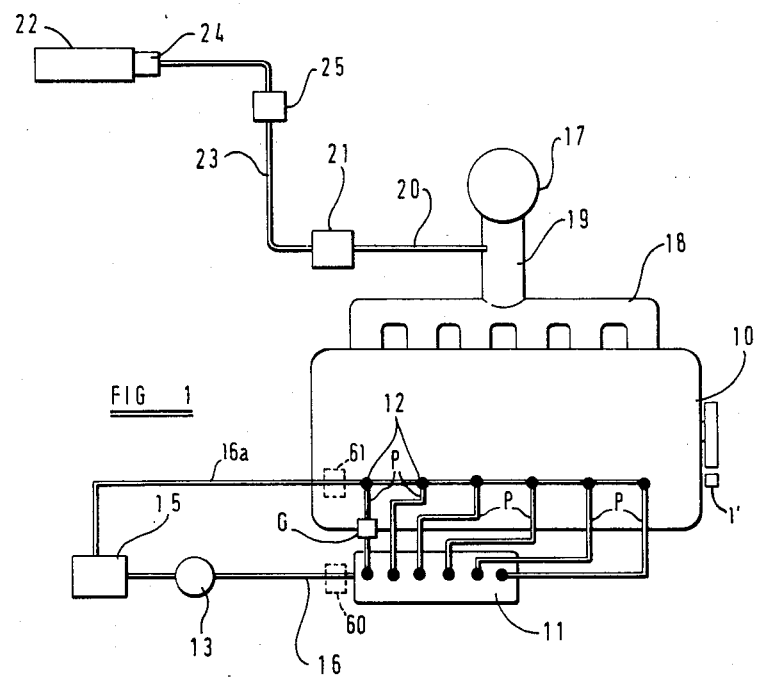
FIG. 1 is a diagrammatic plan view of a dual fuel diesel engine embodying the invention.

Referring to the drawings, in FIG. 1 a conventional six cylinder diesel engine is indicated at 10 and can comprise, for example, the engine of a motor vehicle such as a lorry. The engine 10 has a conventional fuel injection pump 11 of the type which pumps discrete volumes or "slugs" of diesel fuel to conventional injectors 12 by which the diesel fuel oil is injected into the cylinders of the engine. Reference may be made to our published specification No. GB-A-2166267 for a more detailed description of such a pump. The diesel oil is supplied to the injection pump 11 by a lift pump 13 from a diesel oil tank 15 of the vehicle via a pipeline 16 and excess diesel oil from the injectors is returned to the tank 15 via return pipe 16a. Air is inducted from atmosphere via an air intake 17 and fed to the cylinders of the engine by means of a conventional manifold 18. Between the air inlet 17 and the manifold 18 is a duct 19 to which gas fuel is fed along a conduit 20 from a gas supply valve 21 which is supplied with gas from a storage vessel 22 along a conduit 23 via an excess pressure relief valve 24 and a pressure regulator 25.

Figure 3:
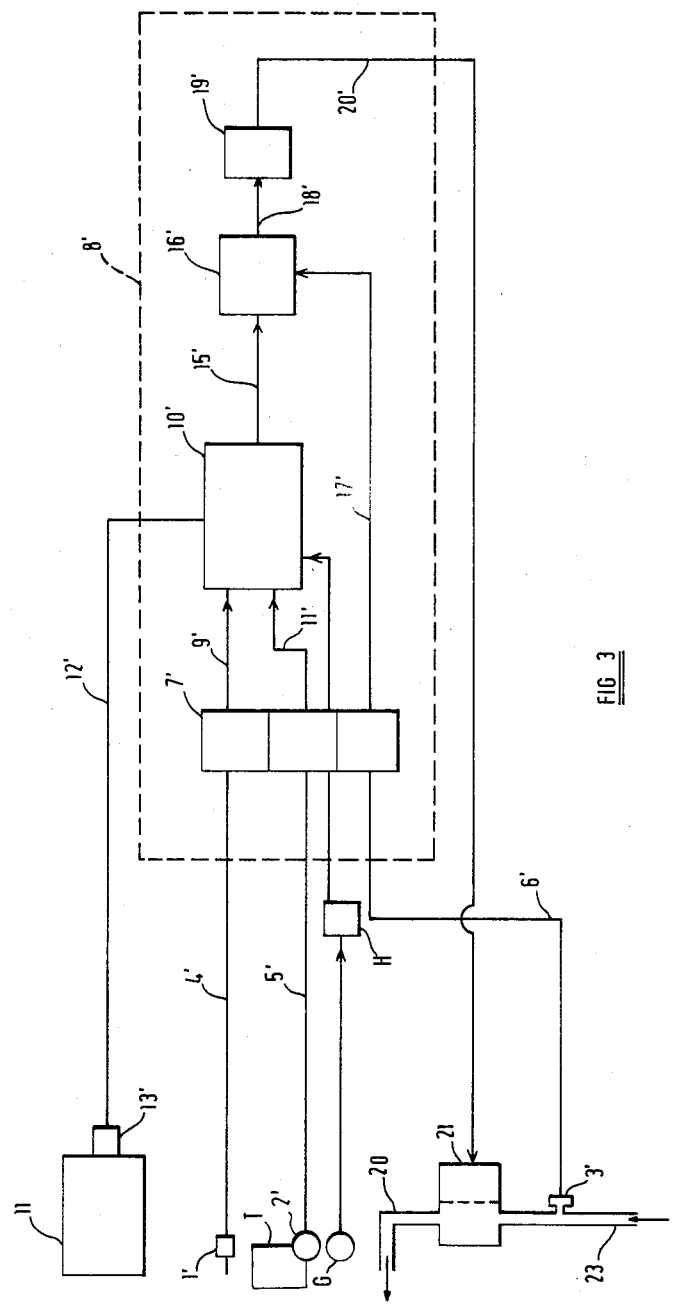
FIG. 3 is a schematic diagram of one embodiment of a fuel control system used for the engine of FIG. 1.

The gas supply control valve 21 may be controlled by any suitable means, for example, as described below with reference to FIG. 3. This fuel control system includes an engine speed transducer 1' for converting information about engine speed into an electrical signal, a throttle position transducer 2' for converting information about the position of the throttle into an electrical signal, and a gaseous fuel pressure transducer 3' for converting information about the pressure of the gaseous fuel in conduit 23 into an electrical signal. The engine speed signal is transmitted along a line 4', and the throttle position signal is transmitted along a line 5' and the pressure signal is transmitted along line 6' to an input filter 7 of a micro-processor 8' shown in dotted lines).

The input filter 7' is a low pass filter and serves to remove any transient noise present in the various signals and to increase the resolution of the signals. The filtered engine speed signal is transmitted along a line 9' to a proportional, integral and derivative control algorithm designated 10'. The filtered throttle position signal is transmitted along line 11' to the control algorithm 10'. The difference between the throttle position and engine speed signals is calculated within the control algorithm 10' and is used as an error signal in the control algorithm.

The control algorithm 10' calculates the required flow rate of fuel and the relative proportions between the gas fuel required and the diesel oil required. The value of the calculated flow rate is compared with the maximum allowable flow rate for the particular engine speed (which is known for any particular engine and engine speed) and if the calculated flow rate is greater than this maximum value, then the value of the calculated flow rate is replaced with the maximum value.

The control algorithm 10' produces two outputs, one of which is representative of the required diesel fuel flow rate. This signal is transmitted along a line 12' to an electro-mechanical device 13' which is connected to the diesel injection pump 11 or to an engine speed governor which is connected to the injection pump 11.

The engine speed governor may be a conventional governor which determines the amount of fuel which sould be supplied to the cylinder through the injection pump 11. This amount of fuel would be the amount of fuel required if the engine was being operated as a diesel only engine. When two fuels are being used, the amount of diesel oil required by the engine is different from when only one diesel oil is being used.

The electro-mechanical device 13' is adapted to prevent the injection pump 11 from delivering the quantity of diesel oil which is demanded by the governor by controlling movement of a control member 11a of the pump (see FIG. 2) in order to control the amount of diesel oil supplied to the engine. Typically the control algorithm 10' operates such that the eletro-mechanical device 13' prevents the injection pump 11 from delivering more than a fixed percentage of the diesel oil which would be supplied at full throttle. An example of a typical percentage is approximately 10%. The device 13' does not prevent the pump 11 from delivering less than this fixed percentage.

The precise percentage of diesel oil injected into each cylinder may be fixed throughout the speed range of the engine or it may be varied somewhat so that the appropriate amount is injected to give satisfactory ignition over the whole speed range of the engine. Because, as explained hereinbefore, we have discovered that as the engine speed increases there is less time for leakage of fuel to occur in the pump and thus more fuel is injected into the engine as speed increases, if the control member 11a is maintained in a constant position, the device 13' may be arranged to cause the control member 11a of the pump 11 to move in the direction to reduce fuel supply as the engine speed increases, even though this can have the effect of maintaing the actual amount of diesel supplied into the cylinder of the engine constant. The device 13', therefore, adjusts the position of the control member 11a of the pump 11 appropriately to give precisely the amount of diesel fuel which it is required to be injected which, as explained, can be a constant amount over the whole speed range of the engine or a variable amount if, for any particular engine, it is found that different amounts of pilot fuel are required at different engine speeds.

In all cases the percentage of diesel oil supplied, compared to that which would be supplied at full throttle, is severely restricted and is of the order of 10% in this example, although of course it may be based on other percentages if desired.

The other output from the control algorithm 10' is transmitted along line 15' to a look-up table 16'. In addition, the filtered information concerning the gaseous fuel pressure is fed along line 17' to the look-up table 16'. The look-up table 16' contains stored informationn concerning gas flow as a function of valve opening and gaseous fuel pressure. Consequently the look-up table 16' can calculate the required opening of valve 21 given the required gas flow (from line 15') and the existing gas pressure (from line 17').

The information concerning the valve opening is transmitted along a line 18' to a low pass output filter 19', and then along a line 20' to the gas valve 21. The gas valve 21' regulates the supply of gaseous fuel between conduit 23 which is connected to the gas storage vessel 22, and conduit 20, which is connected to the duct 19. Reference may be made to our published specification GB-A-2166267 for a more detailed description of the operation of the fuel control system in respect to control of gas flow and the variations therein may be applied mutatis mutandis to the present invention. For example, the gas may be supplied via a gas distributor to a gaseous fuel injector for each engine cylinder.

Figure 2:
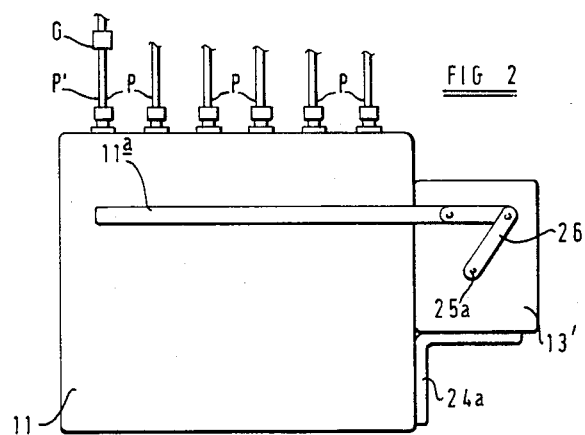
FIG. 2 is a side elevation, to an enlarged scale, of the injection pump of the engine of FIG. 1.

Referring now particularly to FIG. 2, the diesel injection pump is shown at 11 and the conventional control member or rack is shown at 11a. Carried on a bracket 24a provided on the pump 11 is the electro-mechanical device 13' which has an output shaft 25a, the position of which in the present example, is determined by a power means comprising a stepping electric motor under the control of the signal transmitted along the line 12'. The output shaft 25a carries a lever 26 which engages the control member 11a to arrest movement of the control member 11a in the direction to increase the amount of diesel fuel supplied by the pump 11, the position of arrest of the control member 11a being determined as described hereinbefore. No restraint is placed upon the control member 11a from retracting towards its minimum flow position.

Thus, in the event of any failure of the gas flow mechanism in the "open" position, the engine will not overspeed. The mechanical governor controlling the control member 11a, which is an integral part of the diesel fuel injection pump 11, will operate normally and withdraw the control member 11a to a "no flow" condition and thus no pilot fuel will be available and the engine will slow to equilibrium at its governed speed, at which point pilot fuel would again be supplied, without load on it.

The pump 11 is connected to each of the various six cylinders of the engine 10 by a feed line P. In one feed line P', a feed-back signal generating means G is provided which is shown in more detail in FIG. 4.

The generating means G comprises a fitting which is connected in the feed line P', the fitting having an inlet 30 which is connected to a first feed line part to the pump 11, and an outlet 31 which is connected to its respective injector 12 via a second feed line part, a passage 33 extending through the fitting between the inlet 30 and the outlet 31.

Branching from passage 33 is a secondary passage 34 which commucates with a chamber 35 provided by a connector 36 which is received in an opening 37 of the fitting.

Within the chamber 35 is positioned a membrane 38 comprising a disc, which isolates chamber 35 and thus the pressure of the diesel fuel in passage 33 is communicated to the disc 38. A strain gauge 39 is adhered to the disc 38 and an electrical signal is produced in response to the pressure of the diesel in passage 33. This signal is fed via a signal processing means H and a low pass filter 7' to the algorithm 10'.

It will be appreciated that each time the injection pump 11 is operative to pump fuel along the feed line P' in which the generating means G is provided, the pressure of the fuel within the feed line P' will increase.

The strain gauge 39 will produce a signal indicating a sharp rise in pressure as the pump begins to pump, before the injector 12 injects the fuel into the engine, followed by a period of high pressure whilst the fuel is injected, followed by another momentary rise in pressure as the injector again ceases to inject the fuel. Thereafter the pressure will decrease as the pump 11 discontinues pumping fuel to feed line P'.

Thus, the time for which the injector is operative to inject the fuel i.e. the period whilst the injector 12 is operate, can be determined, as well as an indication of the magnitude of the pressure. By knowing the size of passage 33, the amount of fuel delivered to the associated cylinder, and by averaging, to the engine, can be accurately estimated. Thus the algorithm 10' can not only signal device 13' to arrest movement of the control member or rack 11a, but can adjust its position if it is found that too much or too little fuel is actually being delivered as determined from the feed-back signal generated by means G, compared with the calculated optimum amount of fuel.

In an alternative arrangement, instead of feeding the feed-back signal to the algorithm 10', the signal may be fed to an auxiliary control means which is operative to adjust the position of arrested member 11a where the amount of fuel actually delivered is found to be differet to the required optimum amount of fuel.

In use, on initial setting up of the engine, it is necessry to calibrate the fuel feed system, to ensure that the actual amount of diesel fuel being delivered into the engine corresponds with the optimum calculated value as determined by the algorithm 10'. Because of the feed-back signal generated from feed-back generating means G, it is not necessary after this initial calibration to recalibrate the engine. Without the feed-back signal, it will be appreciated that as the engine is used the amount of diesel fuel fed to the engine with the control member in its arrested position, may vary as parts of the engine wear and as the injectors carbonise.

By providing a feed-back signal as described, the arrested position of the control member 11a can be continually adjusted to ensure that the maximum amount of fuel permitted for the given condition of the engine is never exceeded. Further, any inaccuracy in the stepper motor of the device 13', can be accommodated.

Figures 4, 5, 6:
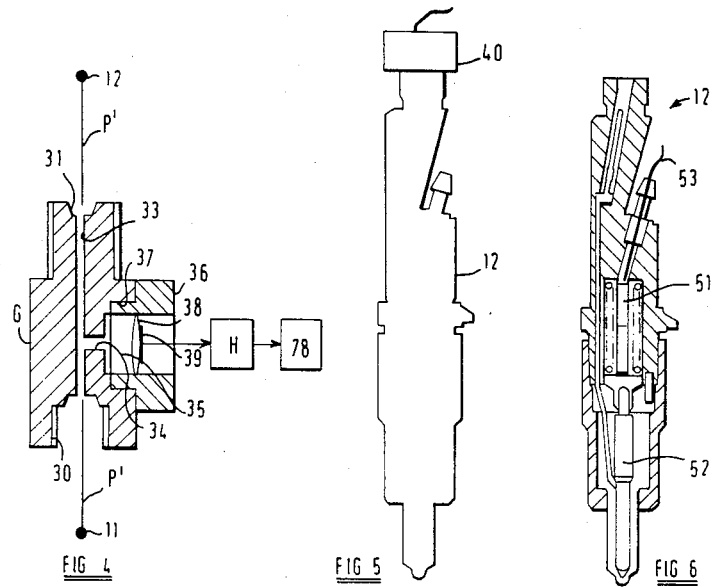
FIG. 4 is a diagrammatic cross-section through part of the engine of FIG. 1.
FIG. 5 is a diagrammatic side elevation of an injector for use in a modification of the engine of FIG. 1.
FIG. 6 is a diagrammatic cross-section through an injector for use in another modification of the engine of FIG. 1.

In another embodiment shown in FIG. 5, instead of a strain gauge the or one or more of the injectors 12 through which pilot fuel is injected into the engine, may have an accelerometer 40 attached thereto to sense the opening and/or closing of the injector and provide a signal from which the amount of fuel injected into the engine may be determined and hence provide a feed-back signal.

In another embodiment, shown in FIG. 6, the one or more of the injectors 12 through which pilot diesel fuel is injected into the engine is provided with means 51 to detect when the injector needle valve is open and thus fuel is being injected and so provide a feed-back signal. The means 51 may comprise an electrical switch actuated by movement of the needle 52, the switch 51 being connected by lead 53 to the control system. In a modification the means 51 may not only simply detect when the injector needle valve is open but may also detect the extent to which the needle valve is open and thus provide a more accurate signal of the amount of fuel which is being injected into the engine. In this modification the means 51 may for example be a potentiometer device.

In another embodiment, shown in FIG. 1, a feed-back signal as described above is provided by determining the different between the amount of pilot diesel fuel being supplied to the injector system and the amount of pilot diesel fuel being returned from the injector system. This is done by providing flow transducers 60, 61 in the flow line 16 and return line 16a respectively. The transducers 60, 61 are shown in dotted line in FIG. 1. By comparing the amount of fuel flowing as determined by the transducers 60, 61 a measure of the amount of fuel injected into the engine is obtained and this provides a feed-back signal which is used, as described hereinbefore, to adjust the position of arrest of movement of the rack 11a in a similar manner to the feed-back signal generated by the means G described hereinbefore.

Figure 7:
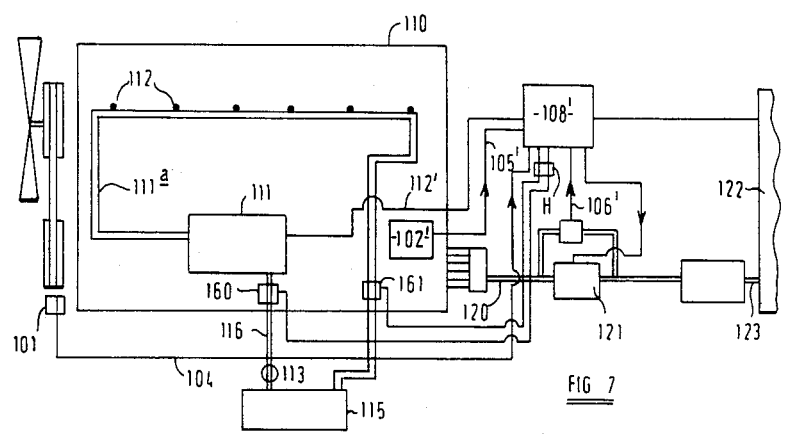
FIG. 7 is a diagrammatic side elevation of an alternative embodiment of dual fuel diesel engine.

In another embodiment, shown in FIG. 7, in which the same reference has been used for corresponding parts as were used in FIG. 1 but with the addition on 100, the engine 100 is provided with an alternative form of injection pump 111 of the type which provides a continuous flow of pressurised diesel fuel to provide a continuously pressurised line 111a by which pilot fuel is fed to the injectors 112. The injectors 112 are of a different type to that described hereinbefore and instead of being actuated by the arrival at an injector of a slug diesel fuel, as in the previously described embodiments, the injectors are opened at the appropriate time in the engine cycle by a cam shaft and permit injection of a discrete volume of diesel fuel into the associated cylinder from the pressurised line in accordance with the time for which the injector is maintained open by the cam shaft and the flow characteristics of the injector.

Such a pressurised line injection system is commonly known as a "Cummins" system.

The dual fuel supply means described hereinbefore in connection with FIG. 1 is used, with appropriate modification, in the present embodiment. Thus, engine speed and throttle position sensors 101' and 102° are provided which provide an input to the microprocessor 108' as is a signal indicative of gaseous fuel pressure difference across the gaseous fuel pressure control valve 121 by a line 106'. In addition, differential flow transducers 160 and 161 provide signals to the microprocessor 108' indicative of the actual amount of diesel fuel injected into the engine.

The control algorithm of the microprocessor 108' provides an output signal as described in connection with the first embodiment to the gas control valve 121' so that the gas supply is controlled as described previously. In addition, the algorithm provides an output signal along line 112' to suitable means to limit the amount of diesel fuel injected by the injectors 112 to a pilot amount similar to the amount of pilot diesel fuel described hereinbefore with reference to the previous embodiments.

The signal provided along line 112' is dependent on the speed sensor 101' which provides a first means which provides a first input to the control means comprised by the microprocessor 108' which will cause it to provide a signal along line 112' to cause pilot fuel to be supplied at a predetermined rate in accordance with the engine speed. However, because as in the case of the first embodiment there are factors whereby the actual amount of pilot diesel fuel injected into the cylinders differs from that intended the flow transducers 160, 161 provide a second means which provide a second input signal to the control means causing modification of the supply of pilot fuel signalled by the first means so that the actually desired amount of pilot diesel fuel is in fact injected into the engine. Although, in the above example the first means provides a first input dependent uponn engine speed the first input may be dependent on some other engine parameter and similarly the second input signal provided by the second means, in the present example as a result of the differential flow detected by the transducers 160, 161, may be provided as a result of sensing some other engine parameter indicative of the actual amount of diesel fuel injected into the engine.

If desired, instead of providing a stepper motor, a DC motor, or any other power means may be provided within device 13' to arrest the position of the control member 11a in the direction to increase the supply of diesel fuel to the engine. Instead of to six cylinder engine the invention may be applied to any other type of engine.

If desired, in both the type of injector system described with reference to FIG. 1 and that described with reference to FIG. 7 a feed-back signal may be provided by sensing the temperature of the pilot fuel which is indicative of the amount of diesel fuel injected into the engine because the amount injected varies with the viscosity of the fuel which varies with temperature, or by sensing the actual power developed by the engine.

The features disclosed in the foregoing description, or the accompanying drawing, expressed in their specific forms or in terms of a means for performing the disclosed function, or a metal or process for attaining the disclosed result, or a class or group of substances or compositions, as appropriate, may, separately or any combination of such features, be utilised for realising the invention in diverse forms thereof.

I claim:

1. A dual fuel compression ignition engine having a gas fuel supply system for the engine to supply gaseous fuel to the engine at a variable rate whereby the speed of the engine is continuously variable, a diesel fuel supply system for the engine including an injection pump and an injector system, a control means to control the amount of pilot diesel fuel injected into the engine, a first means to provide a first input to the control means to cause the control means to supply pilot fuel at a variable predetermined rate, said rate being varied in accordance with at least one operating parameter of the engine and second means to provide a second input to said control means from a feed-back signal indicative of the amount of pilot diesel fuel injected into the engine and the control means being adapted to adjust the supply of the pilot fuel to correspond to that signalled by the first input.

2. A dual fuel compression ignition engine according to claim 1 wherein the diesel fuel supply system includes an injection pump having a governor, responsive to engine speed and engine speed demand, to operate a control member of the pump which controls the amount of diesel fuel injected into the engine by the pump, means to arrest movement of the control member of the pump, in the direction to increase the supply of diesel fuel to the engine, so as to supply pilot fuel into the engine at a substantially constant, rate during dual fuel operation independently of said governor.

3. An engine according to claim 1 wherein said at least one operating parameter comprises at least one of the position of the speed control of the engine and the engine speed.

4. An engine according to claim 1 wherein the injection pump is of the type which pumps discrete volumes of fuel to the injector system.

5. An engine according to claim 1 wherein the injection pump is of the type which provides a continuous flow of pilot diesel fuel which is fed by a continuously pressurized supply line to the injector system and the injector system being arranged to inject discrete volumes of pilot diesel fuel into the or each cylinder of the engine from said supply line.

6. An engine according to claim 4 wherein the feed-back signal is derived from a differential pilot diesel fuel flow means which determines the difference between the amount of pilot diesel fuel supplied to the injector system and the amount of pilot diesel fuel returned from the injector system to provide a signal from which the amount of fuel injected into the engine may be determined to provide said feed-back signal.

7. An engine according to claim 5 wherein the feed-back signal is derived from a differential pilot diesel fuel flow means which determines the difference between the amount of pilot diesel fuel supplied to the injector system and the amount of pilot diesel fuel returned from the injector system to provide a signal from which the amount of fuel injected into the engine may be determined to provide said feed-back signal.

8. An engine according to claim 1 wherein the feed-back signal is dependent upon the temperature of the pilot fuel.

9. An engine according to claim 5 wherein the feed-back signal is dependent upon the temperature of the pilot fuel.

10. An engine according to claim 1 wherein the feed-back signal is dependent upon the power developed by the engine.

11. An engine according to claim 5 wherein the feed-back signal is dependent upon the power developed by the engine.

12. An engine according to claim 1 wherein the engine is provided with a fuel control system comprising flow control means adapted to control the relative proportions of each fuel supplied to the engine, wherein the system includes means to provide an error signal derived from engine speed and throttle position and means responsive to the error signal to supply the diesel and gas fuel to cause the engine speed to tend towards a speed demanded by the throttle position and said control means comprises an electronic signal processing means having a programmed control algorithm in which the difference between said throttle position and engine speed is calculated and used as the error signal.

13. An engine according to claim 4 wherein the feed-back signal is derived from a strain gauge which determines the pressure of the diesel fuel in a feed line from the injection pump, and means to correlate the pressure with the amount of fuel injected into the engine from the injection pump.

14. An engine according to claim 4 wherein the feed-back signal is derived from at least one of the injectors, through which fuel is injected into the engine, provided with an accelerometer to sense at least one of the opening and closing of the injector and provide a signal from which the amount of fuel injected into the engine may be determined to provide said feed-back signal.

15. An engine according to claim 4 wherein the feed-back signal is derived from at least one of the injectors, through which pilot diesel fuel is injected into the engine, provided with means to detect at least one of when and the extent to which a valve of said at least one injector is open and provide a signal from which the amount of fuel injected into the engine may be determined to provide said feed-back signal.

* * * * *